Figure 1:
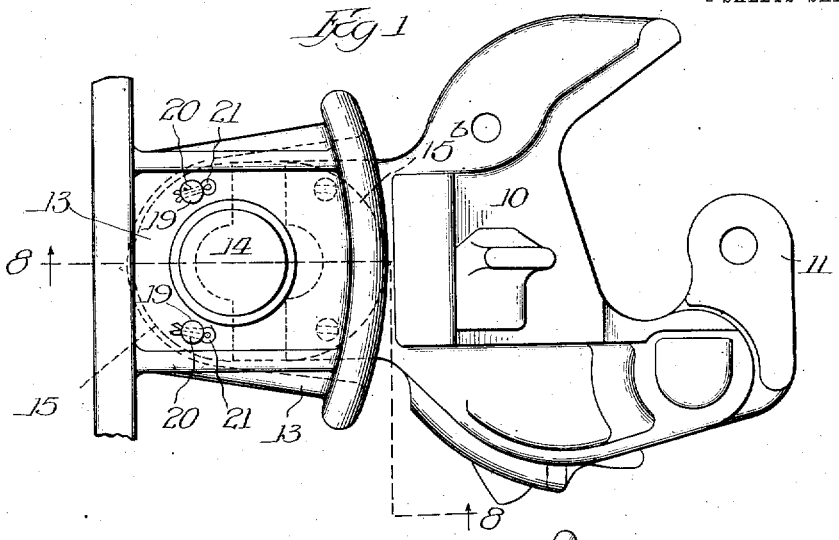

E. P. KINNE.

POCKET COUPLING.

APPLICATION FILED OCT. 25, 1912.

Reissued Feb. 16, 1915.

13,881.

2 SHEETS—SHEET 1.

Witnesses:

Geo. C. Dixon

H. G. Barnett

Inventor:

Edmund P. Kinne

By Smith, Burn, Betts & Fuller

Attys

E. P. KINNE.

POCKET COUPLING.

APPLICATION FILED OCT. 25, 1912.

Reissued Feb. 16, 1915.

13,881.

2 SHEETS—SHEET 2.

Witnesses:

Geo. E. Davison

H. E. Barrett

Inventor:

Edmund P. Kinne.

By Lothrop, Bell & Fuller

Attys.

UNITED STATES PATENT OFFICE.

EDMUND P. KINNE, OF ALLIANCE, OHIO, ASSIGNOR TO AMERICAN STEEL FOUNDRIES, OF NEW YORK, N. Y., A CORPORATION OF NEW JERSEY.

POCKET-COUPLING.

13,881. Specification of Reissued Letters Patent. Reissued Feb. 16, 1915.

Original No. 1,009,975, dated November 28, 1911, Serial No. 583,771. Application for reissue filed October 25, 1912. Serial No. 727,776.

*To all whom it may concern:*

Be it known that I, EDMUND P. KINNE, a citizen of the United States, residing at Alliance, in the county of Stark and State of Ohio, have invented certain new and useful Improvements in Pocket-Couplers, of which the following is a specification.

My invention relates to pocket couplers and refers particularly to a means employed for the purpose of regulating or adjusting the height of a coupler shank within the pocket.

It is well known that for coupling purposes, a coupler pocket is ordinarily employed on the front end of a locomotive. The shank of a coupler is held in this pocket by means of a suitable pivot pin. As the tires on the wheels of the engine become worn to any great extent and the springs settle, it will be apparent that the coupler pocket will occupy a position in a lower horizontal plane, thereby causing the coupler to also occupy a lower position. At the same time the coupler shank is liable to cause distortion of the pivot pin and either the lower surface of the coupler shank or the lower internal surface of the coupler pocket becomes worn with the result that these factors either singly or in combination with each other cause the coupler head and its shank to sag downwardly in a forward direction. In order to cause the coupler shank to retain a correct position as the tires on the wheels of the locomotive become worn and the springs settle, I provide one or more shim blocks which are fastened to the internal surface of the coupler pocket. When the engine is new and it is therefore desired to have the coupler shank occupy its lowest possible position within the coupler pocket, the lower surface of the coupler shank rests against the lower internal surface of the coupler pocket and the shim block is fastened to the upper internal surface of the coupler, the lower surface of the shim block engaging the upper surface of the coupler shank. When on account of wear, as previously described, it is desired to raise the coupler shank with respect to the coupler pocket, the shim which is fastened to the upper internal surface of the coupler pocket is detached therefrom and fastened to the lower internal surface, thereby causing the coupler shank to be raised. When the coupler shank begins to sag forward for the reasons which have been described above, this tendency may be counteracted by inserting a comparatively thin shim block between the lower surface of the coupler shank and the lower internal surface of the pocket, this shim being preferably in a position near the forward edge of the coupler pocket.

It will be apparent that any desired position of the coupler head and its associated shank may be obtained by a suitable proportioning of shims. For example, if the coupler shank is too low when its lower surface rests against the lower internal surface of the coupler pocket, and too high when the upper surface of the coupler shank comes in contact with the upper internal surface of the coupler pocket, a pair of shims, each one-half the thickness of the shim which would be used were only a single one employed, may be used.

Figure 2:
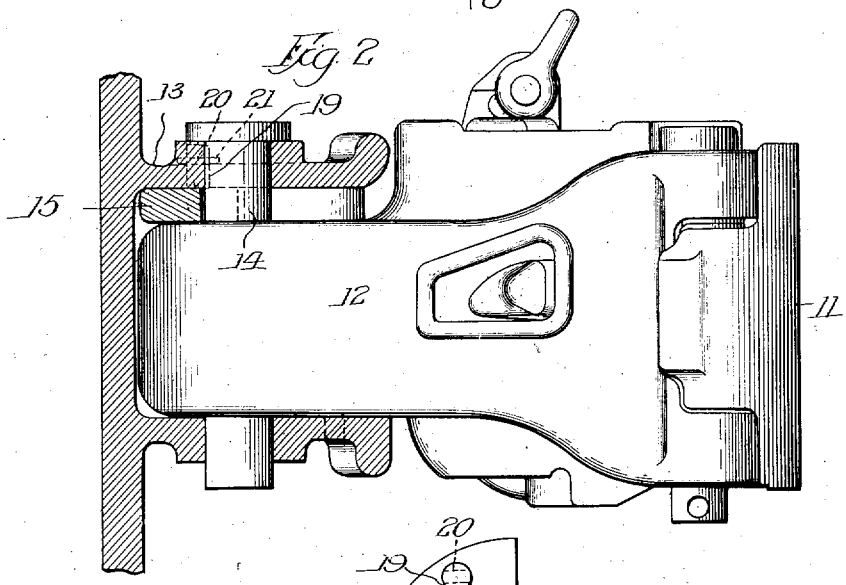
Figure 3:
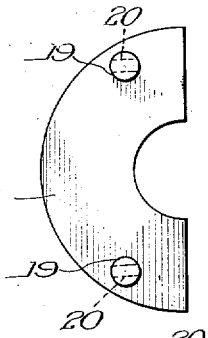
Figure 4:
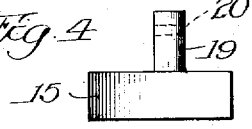
Figure 5:
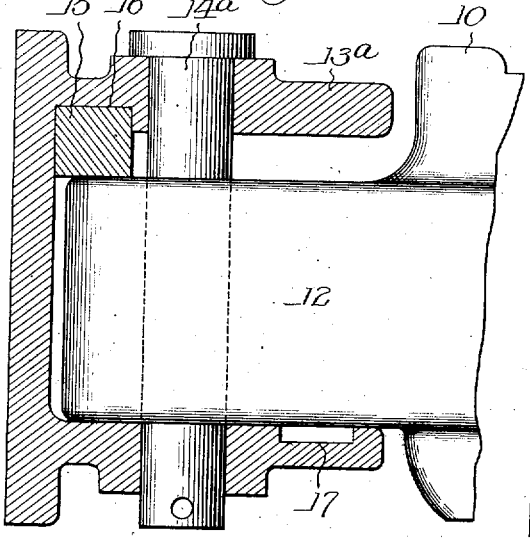
Figure 6:
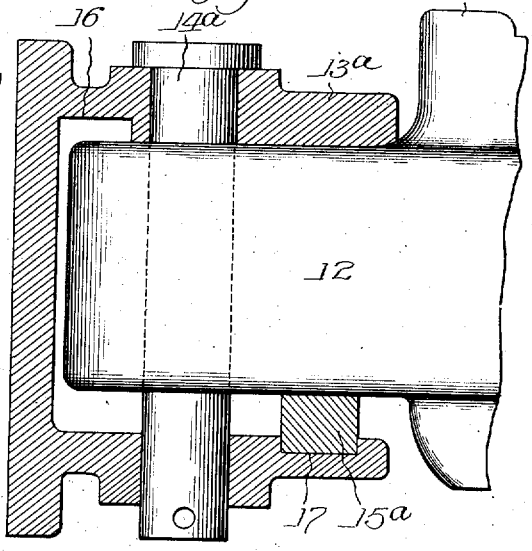
Figure 7:
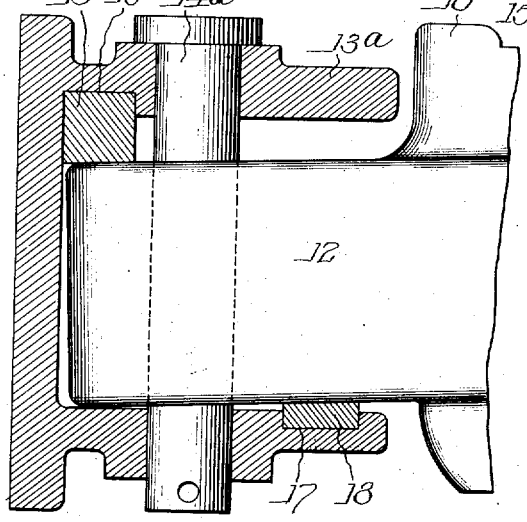
Figure 8:
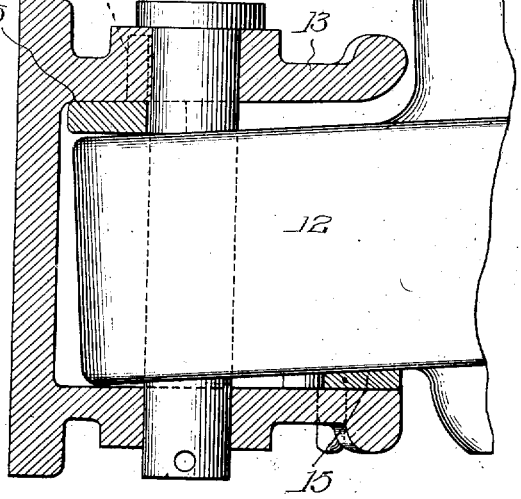

I am aware that heretofore devices have been used for the purpose of adjusting the position of the coupler shank in the coupler pocket. However, I consider my construction preferable inasmuch as in my device the shims are fastened securely to the internal wall surfaces of the coupler pocket and are entirely independent of the pivot pin. These and other advantages of my invention will be more apparent by reference to the accompanying drawings which represent preferred embodiments of my invention and in which:

Figure 1 is a plan view of a pocket coupler constructed in accordance with my invention, two shims being shown in place, one in the upper, rear portion of the pocket and the other in the lower, forward portion thereof; Fig. 2 is a vertical section through the construction of Fig. 1, except that the lower, forward shim has been removed; Fig. 3 is a plan view of a shim constructed in accordance with my invention; Fig. 4 is an elevation thereof; Fig. 5 is a vertical section through a construction similar to that shown in the preceding figures except that the shims are rectangular and a recess is provided in the coupler pocket within which the shims may be fitted. In this figure the shim is shown in the upper, rear portion of the pocket; Fig. 6 is a similar view, the shim being transferred from the upper, rear portion to the lower, forward portion of the pocket; Fig. 7 is identical with Fig. 5, except that an auxiliary shim is placed in the lower, forward recess to overcome the tilting action of the coupler, and, Fig. 8 is a section on the line 8—8 of Fig. 1.

As most clearly shown in Figs. 1 and 2, a coupler consisting of the head 10, the knuckle 11, and the coupler shank 12 of the usual construction is retained in a coupler pocket 13 which is attached to a locomotive. The coupler shank 12 is held in position by the pivot pin 14 which passes through suitable apertures in the upper and lower walls of the coupler pocket 13, and a corresponding aperture in the coupler shank 12. The shape of the coupler pocket 13 is such that a slight amount of lateral movement of the coupler shank is permitted on the pivot pin 14.

The height of the coupler pocket is somewhat greater than that of the coupler shank. In order to keep the latter in a horizontal position, it will be evident that some supporting means should be used in addition to the pivot pin 14, inasmuch as the latter does not fit tightly within the aperture in the coupler shank, and the coupler would tend to tilt were it not supported in position. Such a support is provided by means of a shim 15, as shown in Figs. 1 to 4 and 8. This shim is of semi-circular shape and is provided with upwardly projecting lugs 19, adapted to pass through apertures in the upper wall. These lugs are apertured as at 20, to accommodate cotter pins 21, in order to secure the shim in position. The shim may be transferred to the lower, forward portion of the pocket in order to elevate the coupler shank as required or an auxiliary shim $15^b$ may be provided, as shown in Figs. 1 and 8, in order to overcome the tendency of the coupler to tilt after wear has taken place. Such an auxiliary shim may be a duplicate of the shim 15 and be provided with lugs which project through openings in the lower wall in order to secure it in place.

The construction of Figs. 5 to 7 differs slightly from that just described. In that construction the coupler pocket $13^a$ is provided with recesses 16, 17 in the upper, rear and lower front walls respectively, within which a shim $15^a$ is adapted to be fitted. This shim is shown as rectangular in outline and may be fitted in place or secured in the recesses by some other suitable means. In Fig. 5 the shim is shown as applied when the locomotive is first put in service. However, as the tires wear and the springs become depressed, the coupler should be elevated, in which case the shim is taken from the position of Fig. 5 and placed in the position of Fig. 6. Prior to the time when it may become necessary to place the shim as shown in Fig. 6, it may be desirable to place an auxiliary shim 18 in the lower pocket 17, to overcome the tendency of the coupler to tilt.

The pocket construction herein shown is adapted for use either with or without the auxiliary shims, it being understood that the seats in the upper, rear or lower, forward portions in both forms of the pockets are adapted to accommodate shims, as required in order to secure the coupler at the proper elevation.

It will be clear to those skilled in the art that considerable change could be made in the exact construction of the parts which I have described without departing from the spirit of my invention.

I claim:

1. The combination with a coupler and pivot pin, of a coupler pocket of greater internal height than the coupler shank, the upper wall of said pocket being provided with a shim seat near its inner end and a lower wall having a shim seat near its outer end, and a shim for engaging said coupler shank and adapted to be secured in one of its seats and thereby regulate the height of said coupler shank, substantially as described.

2. The combination with a coupler and coupler pin, of a coupler pocket of greater internal height than the coupler shank, a shim attached to the internal surface of said pocket and engaging the inner end of the coupler shank, and an auxiliary shim attached to the opposite internal surface of said pocket to counteract the drooping of said coupler shank, substantially as described.

3. In a device of the class described, the combination of a car coupler having a short shank, a pocket adapted to be secured to a car and to accommodate said coupler shank, said pocket being of greater internal height than the height of said shank, and a shim constructed to partially surround the coupler pivot pin and to interlock with said pocket either above or below said shank, whereby the height of said shank in said pocket may be adjusted, substantially as described.

4. In a device of the class described, the combination of a car coupler having a short shank, a pocket adapted to be secured to a railway car and to accommodate said coupler shank said pocket being of greater internal height than the height of said shank and provided with upper and lower apertures, and a shim having a lug adapted to be accommodated in one of said apertures and to be maintained in position either above or below said shank, whereby the height of said shank may be adjusted, substantially as described.

5. The combination with a bracket having a flaring socket which is adapted to receive the shank of a car coupler, of a coupler having a shank which is insertible through the mouth of and extends into said socket and is connected thereto by means of a pivot pin so as to be capable of swinging with respect to said bracket, and an adjusting plate arranged within said socket and interposed between said bracket and the shank of said coupler, said adjusting plate being insertible through the mouth of the flaring socket and being bifurcated to straddle said pivot pin and being provided with means for engaging said bracket to secure said adjusting plate in position in said socket.

6. The combination with a bracket having a socket which is adapted to receive the shank of a coupler, of a coupler having a shank extending into said socket, means for securing said coupler to said bracket, and an adjusting plate arranged in said socket between said coupler shank and bracket, said adjusting plate having a lug upon one side and the upper and lower walls of said socket being provided with recesses adapted to receive the lug on said adjusting plate, whereby said plate may interlock with said bracket and be maintained in position in said socket either above or beneath the coupler shank.

EDMUND P. KINNE.

Witnesses:
LAUNA CARLISLE,
CLYDE COFFMAN.